tent Office 2,882,130
Patented Apr. 14, 1959

2,882,130

PROCESS FOR PRODUCING HYDROGEN SULFIDE AND CARBON BISULFIDE

David J. Porter, Painesville, Ohio, assignor to Food Machinery and Chemical Corporation, San Jose, Calif., a corporation of Delaware No Drawing. Application August 9, 1954
Serial No. 448,741

11 Claims. (Cl. 23—181)

This invention relates to the production of carbon bisulfide by the reaction of sulfur with hydrocarbons.

Various attempts have been made to produce carbon bisulfide by the reaction between hydrocarbons and sulfur in vapor phase in the presence of a catalyst promoting the production of carbon bisulfide. Numerous catalysts have been proposed and tested for this purpose. Operating temperatures for such processes vary from 350° C. to approximately 1100° C. With efficient catalysts, carbon bisulfide in attractive commercial yields can be produced by this reaction at temperatures of around 600° to 700° C.

The successful operation of a catalyst bed for carbon bisulfide production, however, involves several difficulties. Below a temperature of approximately 750° C. the reaction between sulfur vapors and hydrocarbon gases in the presence of a catalyst is endothermic and requires that the catalyst bed either be heated or that the gases be heated to a high temperature, above the reacting temperature in the catalyst bed, so as to support the reaction in the catalyst bed. The nature of the reaction and the temperatures used are such that the catalyst bed frequently becomes fouled or poisoned by the reacting materials or with by-products of the reaction and it is necessary to frequently purge or renew the catalyst.

When the feed hydrocarbon vapors are predominantly $C_1$ and $C_2$ hydrocarbons, namely, methane and ethane, the reaction progresses with the production of carbon bisulfide and hydrogen sulfide and little or no side reaction products result. Difficulty is experienced, however, when a feed stock, comprised predominantly of one type of hydrocarbon, but containing substantial amounts of hydrocarbons heavier and/or more reactive than the main component, is subjected to the same reaction with sulfur. When a feed stock, of which the main component is methane, such as natural or manufactured gas, but which contains a minor portion of hydrocarbons having three or more carbon atoms per molecule, is reacted with sulfur vapor in the presence of a catalyst to form carbon disulfide, the reaction of the $C_3$ and heavier hydrocarbon fraction of the feed stock to form carbon disulfide is accompanied by the formation of viscous polymeric sulfur containing compounds. This is due to side reactions which degrade into tar and coke. These side reaction products deposit on the catalyst leading to decreased catalyst activity, decline in production and difficulties in catalyst regeneration. Similarly, the presence of substantial amounts of hydrocarbons having four or more carbon atoms per molecule in a hydrocarbon mixture, such as one in which the main component is propane, will tend toward side reactions and tar formation. Consequently, continuous methods for the catalytic preparation of carbon disulfide from hydrocarbon feed stocks containing components which tend to decompose into tar and coke or yield viscous polymers in the presence of sulfur has been beset by inefficiency, catalyst losses and troublesome plugging of equipment.

The plugging of the equipment and/or the loss of catalyst activity due to fouling or other causes, normally requires shutting down the plant, opening the catalytic reactor and replacing the catalyst or interrupting the carbon disulfide formation cycle to blow out, burn out or otherwise regenerate the catalyst. The efficiency of the operation of the catalyst also varies with changes in its activity during use so that frequent changes in operating conditions are necessary to maintain high yields. All these disadvantages of catalytic processes of producing carbon bisulfide make it desirable to reduce or eliminate the use of the catalytic reaction in the formation of carbon bisulfide by the reaction of sulfur and hydrocarbon vapors.

I have found that commercially attractive yields of carbon bisulfide can be produced by the reaction of sulfur vapor and hydrocarbons under superatmospheric pressure at operating temperatures below 700° C., and preferably above 450° C., without the use of a catalyst and with uniformity, when certain conditions of operation are followed.

One of the objects of my invention, therefore, is to produce carbon bisulfide by the reaction of hydrocarbons and sulfur without the use of a catalyst bed or catalyst bed reactor and to thereby avoid or materially reduce the defects and objections inherent in the use of catalyst bed reactors in the prior process of producing carbon bisulfide by reaction of hydrocarbons and sulfur vapor.

Another object of my invention is to provide a process for producing carbon bisulfide by the reaction of hydrocarbons and sulfur vapor which can be operated in an apparatus of simple design and without the necessity of frequent suspension and dismantling of the apparatus for cleaning or renewal of a catalyst bed.

Another object of the invention is to provide a process and apparatus for the production of carbon bisulfide by the reaction of hydrocarbons and sulfur in vapor phase which is simple in operation and construction and can be operated over long periods of time without clogging or material diminution in output of carbon bisulfide.

Another object of my invention is to provide a process for the production of carbon bisulfide from sulfur and hydrocarbons without the use of a catalyst bed reactor which is simple to operate and flexible to control so that, by variation of feed rate, temperature and pressure, the process can be readily controlled to produce carbon bisulfide at the desired rate.

Various other objects and advantages of my invention will appear as this description proceeds.

I have discovered that if the time the reacting hydrocarbons and sulfur vapor are in contact at the desired reacting temperature is correlated with the pressure on the reacting gases that the percentage conversion of hydrocarbons to carbon bisulfide can be controlled within wide limits to provide substantial conversion of the hydrocarbon and sulfur to carbon bisulfide without the use of catalysts or in the absence of normally used catalytic materials.

In the catalytic production of carbon bisulfide by reaction of hydrocarbons and sulfur vapor at elevated temperatures, the reaction is most generally carried out by passing a mixture of hydrocarbon gases and sulfur vapor over a catalyst selected from the group consisting of activated alumina, silica gel, fuller's earth, bauxite and synthetic silica-alumina. These catalysts are sometimes used alone or in admixture with one or more compounds of metals of groups V, VI, VII and VIII of the periodic table. In addition, various oxides or sulfides of iron, chromium, manganese, molybdenum and vanadium are useful as catalysts or as catalyst promoters when used with the activated alumina, silica gel, fuller's earth, bauxite, or other porous carrier. Other materials may also be used as catalysts.

It is usual to preheat the mixture of hydrocarbon gases and sulfur vapor to a temperature between 500° C. and 750° C. prior to contact with the catalyst. Space velocities are are variable between rather wide limits, depending upon the conditions of operation employed, and although higher or lower space velocities are operable, the preferred range is from 400 to 3,000 reciprocal hours. Space velocity is defined as the ratio of total volume of gases (sulfur vapor calculated as the $S_2$ modification) at 0 C. and 760 mm. pressure passing over the catalyst per hour to the volume of space which the catalyst occupies.

The catalytic process may be carried out at atmospheric, subatmospheric or superatmospheric pressure and is normally carried out at a low superatmospheric pressure, sufficient to move the reactants and the resulting products such as $CS_2$ and $H_2S$ through the reaction chambers and the subsequent product recovery system. Pressures of the order of 20 to 60 lbs. per sq. in. have been specified. Catalytic processes of this type are described in the patents to Thacker No. 2,330,934 and Folkins et al., No. 2,568,121.

Usually the space velocities are those normally resulting from the pressure employed and the volume of gas fed as related to the size of the equipment, and no attempt is made to reduce the space velocity or increase the contact time as the pressure on the reacting gases is increased. In some cases where the hydrocarbon gases are heated separately from the sulfur vapors, the residence time of the hydrocarbon gases at high temperature is reduced so as to avoid cracking.

The process of my invention consists in carrying out the reaction under pressure and may be practiced in any apparatus in which hydrocarbons and sulfur vapors heated to temperatures of 450° C. to 700° C. may be subjected to the required conditions of space velocity and pressure. Preferably, the process is carried out continuously in apparatus through which the hydrocarbons and sulfur vapor may flow at the desired pressure, temperature and space velocity to effect the desired conversion and from which the carbon bisulfide and hydrogen sulfide may be recovered from the unreacted sulfur and hydrocarbon gases by the usual methods of recovery. Although the process may also be carried out in batch operations in which the hydrocarbons and sulfur vapor may be heated and mixed together in batches and retained in contact for the required length of time at the desired pressure, the batch operation, except for very limited production, is not recommended.

A convenient way to practice the process of my invention is to pass sulfur vapor and hydrocarbon gases through tubes heated to substantially uniform temperature and in which the reacting gases may be subjected to the desired pressure at the required space velocity. Single reactor chambers such as the catalyst chambers of the prior catalytic processes of producing carbon bisulfide may be used and the hydrocarbons and sulfur vapor subjected to the desired pressure and at the space velocity employed in such prior catalyst chambers, without, however, using a catalyst therein, and a combination of my non-catalytic reaction with a subsequent catalytic reaction may be used, if desired.

The following examples which are set forth for illustration and not by way of limitation of my invention show various ways in which the invention may be practiced:

EXAMPLE 1

A hydrocarbon gas containing 94.6% methane, 4.1% ethane and 1.3% nitrogen, together with melted sulfur, was passed through a reactor made of a 16½" length of 6" inside diameter stainless steel pipe having a surface area of 1.05 sq. ft. per cu. ft. of volume and provided with closed ends into which inlet and outlet pipes were connected. The reactor was placed in 4 inches of fire brick inside a furnace provided with means to heat the reactor and the methane and sulfur. The hydrocarbon gas and sulfur were heated separately and were mixed just prior to entry into the reactor. Different ratios of sulfur to carbon were fed to the reactor and different pressures, temperatures and space velocities were used, and reactions between the methane and sulfur carried out under various conditions as set forth below:

*Table 1-A*

| Run No. | Press., Atm. | $S_2/CH_4$ Ratio | Space Velocity | Temp., ° C. | $CH_4$ Conversion, Percent |
|---|---|---|---|---|---|
| 10 | 1.0 | 2.25 | 380 | 606 | 11 |
| 13 | 4.4 | 4.3 | 605 | 635 | 87 |
| 14 | 6.9 | 2.25 | 373 | 594 | 73 |
| 15 | 1.0 | 2.25 | 394 | 606 | 9 |
| 17 | 4.4 | 2.2 | 365 | 636 | 71 |

At this point the reactor was packed with stainless steel turnings so that its ratio of surface to volume was increased to 66.7 sq. ft. per cu. ft. and the following reactions carried out:

*Table 1-B*

| Run No. | Press., Atm. | $S_2/CH_4$ Ratio | Space Velocity | Temp., ° C. | $CH_4$ Conversion, Percent |
|---|---|---|---|---|---|
| 20 | 4.6 | 2.1 | 378 | 599 | 64 |
| 21 | 4.5 | 2.1 | 378 | 632 | 78 |
| 22 | 4.6 | 2.15 | 378 | 622 | 70 |
| 23 | 4.8 | 1.9 | 325 | 624 | 87 |
| 24 | 4.6 | 2.15 | 737 | 613 | 58 |
| 25 | 4.6 | 2.1 | 192 | 650 | 100 |

At this point the steel turnings were removed from the reactor so that the reactor was restored to its original volume and the following reactions were carried out:

*Table 1-C*

| Run No. | Press., Atm. | $S_2/CH_4$ Ratio | Space Velocity | Temp., ° C. | $CH_4$ Conversion, Percent |
|---|---|---|---|---|---|
| 32 | 1.0 | 2.0 | 486 | 624 | 16 |
| 38 | 6.0 | 2.0 | 450 | 635 | 91 |

At this point the pressure and temperature were increased and the following reactions carried out:

*Table 1-D*

| Run No. | Press., Atm. | $S_2/CH_4$ Ratio | Space Velocity | Temp., ° C. | $CH_4$ Conversion, Percent |
|---|---|---|---|---|---|
| 40 | 7.7 | 2.0 | 153 | 662 | 96 |
| 41 | 7.6 | 1.9 | 166 | 652 | 98 |
| 42 | 7.6 | 1.85 | 163 | 662 | 97 |
| 43 | 7.6 | 2.0 | 159 | 670 | 97 |

Space velocity in the above tables is the ratio of total volume of gases (sulfur vapor calculated as the $S_2$ modification) at 0° C. and 760 mm. pressure passing through the reactor per hour to the volume of the reactor.

As one might expect that a corroded reactor surface might provide a catalytic effect, runs 10 and 15 were made for comparison of this possibility: run 10 with a non-corroded reactor and run 15 after several days of exposure of the reactor walls to sulfur vapors to show that there is no increased conversion of sulfur and methane to carbon bisulfide because of corrosion on the walls of the reactor chamber.

Runs 17 and 21 made at approximately the same space velocity indicate that the increased metallic surface area in run 21 due to the metal packing in the reactor does not increase the conversion.

The influence of space velocity is indicated by comparing runs 22 and 24, in which a substantially two-fold difference in throughout was made between runs 22 and 24 with a consequent increase in space velocity in run 24 and reduction in conversion of the reactants to carbon bisulfide.

Runs 10, 20 and 14, made at pressures, respectively of 1.0, 4.6 and 6.9 atmospheres, and with resulting percentage conversion of the hydrocarbon gas to carbon bisulfide of 11, 64 and 73%, show the effect of increased pressure on the reactants at approximately the same space velocity and temperature.

In run 23 a low grade methane having the composition $CH_4$ 86.1%, $N_2$ 1.5%, $C_2H_6$ 8.6%, $C_3$ 2.4%, $C_4$ 1.0% and $C_5$ 0.6% was used. The conversion yield and the product quality indicate that the presence of higher homologues in the gas do not lead to complications in the non-catalytic process such as those encountered in the use of impure methane in the catalytic process where tarry formations, fouling of the catalyst, and contamination of the product are encountered.

In run 40 a gas analyzing 94.6% methane, 4.1% ethane and 1.3% nitrogen was used; in run 43 a gas analyzing 99.0% methane and not over 0.5% ethane was used; and in runs 41 and 42 a gas analyzing 86.1% methane, 8.4% ethane, 2.4% propane, 1% butane, 0.6% pentane, and 1.5% nitrogen was used. Substantially equal conversion was attained with the pure and impure hydrocarbon gas and analysis of the carbon bisulfide produced showed the resulting products to be of high purity in all cases.

It will be appreciated that in reactions of this type it is not possible to maintain exactly the same temperature and other reaction conditions between different runs and that minor variations in yields may be explainable on the basis of variables not under complete control in the various reactions, also that at high conversion levels the methods of analysis are not sufficiently accurate to show minor differences in yield.

EXAMPLE 2

A hydrocarbon gas of the analysis of Example 1 together with melted sulfur was passed through a bank of eight tubes each 6 ft. in length connected in series and enclosed in a furnace. The tubes had a free inside diameter of 1.5 inches and provided a surface area to volume ratio of 32 sq. ft. per cu. ft. The liquid sulfur and hydrocarbon gas were mixed at the inlet to the furnace and the resulting product gas was passed out of the furnace through a manually controlled pressure valve. A sample tap was located so that samples of the product gas emerging from the furnace could be taken. The furnace was heated and thermocouples were used to determine the temperature at various points therein. The sulfur was pumped under various pressures into the furnace and the following results obtained:

Table 2

| Run No. | Press., Atm. | $S_2/CH_4$ Ratio | Space Velocity | Temp., °C. | $CH_4$ Conversion, Percent |
|---|---|---|---|---|---|
| 45 | 4.4 | 2.3 | 173 | 680 | 96 |
| 47 | 4.4 | 1.7 | 143 | 630 | 83 |

In the above table, spaced velocity is determined in the same manner as defined in Example 1.

EXAMPLE 3

Natural gas, analyzing approximately 86.7% $CH_4$, 5.8% $C_2H_6$, 5.3% $C_3H_8$, 1% $C_4H_{10}$, and traces of higher hydrocarbons, together with melted sulfur, was passed through a furnace containing 170 linear feet of stainless steel tubes which were 6 inches inside diameter and provided a surface area to volume ratio of 8.0 sq. ft. per cu. ft.

The liquid sulfur and gas were mixed at the inlet to the furnace and flowed through tubes of the furnace at a pressure of 3 to 3.4 atmospheres. The rate of sulfur and gas feed was varied to give different space velocity and at lower space velocity higher conversion of the hydrocarbon gas to carbon bisulfide was attained. The following is a table of results:

Table 3

PRESSURE 3 TO 3.4 ATMOSPHERES

| Run No. | Feed Ratio, $S_2/CH_4$ | Space Velocity | Vapor Out Temp., °C. | $CH_4$ Conversion, Percent |
|---|---|---|---|---|
| 50 | 2.6 | 206 | 670 | 95 |
| 51 | 2.1 | 177 | 665 | 78 |
| 52 | 2.8 | 217 | 665 | 89 |
| 53 | 2.4 | 211 | 695 | 91 |
| 54 | 3.1 | 307 | 696 | 99.5 |
| 55 | 2.4 | 296 | 660 | 83 |
| 56 | 2.8 | 326 | 683 | 85 |
| 57 | 2.9 | 394 | 657 | 72 |
| 58 | 2.5 | 399 | 650 | 61 |
| 59 | 2.6 | 405 | 645 | 59 |
| 60 | 2.4 | 388 | 649 | 49 |
| 61 | 2.5 | 260 | 700 | 98 |
| 62 | 2.7 | 416 | 650 | 41 |
| 63 | 2.2 | 365 | 638 | 41 |
| 64 | 3.4 | | 630 | 45 |

Temperature meaurements are the outlet temperatures for the heater which varied between 638° C. and 700° C. There were also uncontrollable variations in the temperatures at the inlet to the furnace and in the various portions of the furnace. The results, however, may be considered to show the conditions under which carbon bisulfide may be produced by the reaction of hydrocarbons and sulfur vapor at temperatures of 450° C. to 700° C. or specifically 638° C. to 700° C. and under superatmospheric pressure, without the use of a catalyst, by suitable control of the space velocity. In general, lower space velocity and therefore longer contact time, at the reaction temperature, provided higher conversion.

It will be obvious that, if desired, the noncatalytic reaction described above may be followed by a catalytic reaction in accordance with the teaching of the Thacker No. 2,330,934 and Folkins et al. No. 2,568,121 patents in which the components of the noncatalytic reaction are passed through reaction chambers containing catalysts promoting the formation of carbon bisulfide to still further react the hydrocarbons and sulfur and produce more carbon disulfide per pass.

In the above table, the space velocity is determined in the same manner as defined in Example 1.

Generally, a space velocity of 500 to 150 reciprocal hours is necessary to produce a conversion of 40% to 95% of the hydrocarbons to sulfur compounds at pressures of the order to 3 to 7 atmospheres, and at temperatures of 450° to 700° C. Higher pressures, of the order of 7 to 15 atmospheres, may be used, and at these pressures the space velocity may be increased without reducing the conversion obtained or a greater conversion at the same space velocity may be obtained at higher pressures.

When operating outside the preferred pressure and temperature ranges as given above, the volume of the reactor may be from about 1/80 to about 1/1000 of the volume of gases charged per hour when measured under standard conditions as defined above, or stated in other words, the rate of charge of sulfur and hydrocarbon vapors to the volume of the tubular or other form of non-catalytic reactor should be such as to provide a space velocity within the reaction chamber of from 80 to 1000 reciprocal hours. Preferably, the retention time of the gases at super-atmospheric pressure and reaction temperature in the non-catalytic reaction should be between 0.2 and 0.0016 hour, or between 1.2 minutes and 6 seconds.

While it is preferable to maintain the temperature between 450° and 700° C., any temperature range from 350° to 1100° C. may be used, pressures of from 3 atmospheres upward may be used and retention time or space velocity adjusted to give the desired conversion. The percent conversion will increase as the retention time is increased and the total throughput or space time yield will be correspondingly decreased so that a proper economic balance between retention time or space velocity and total throughput for each set of operating conditions must be determined.

In general, I have found that an increase in temperature and pressure for the non-catalytic reaction produces an increase in conversion and that an increase in the time during which sulfur vapors and the hydrocarbons are in contact at a constant temperature and pressure produces an increase in the conversion.

The fact that commercial yields of carbon bisulfide can be produced by the reaction of sulfur and hydrocarbons at superatmospheric pressure and temperatures between 450° C. and 700° C. without the use of a catalyst is surprising is view of prior work on the reaction of sulfur and hydrocarbons to produce carbon bisulfide in the presence of a catalyst.

The design of the apparatus for this purpose is relatively simple and can be widely varied from that described, and the operation and maintenance of the apparatus and control of the process is much simpler than the operation and maintenance of an apparatus involving the use of a catalyst bed through which the heated reacting gases must pass. As no catalyst is needed, fouling of the catalyst bed and diminution of catalyst activity is entirely avoided. Relatively impure gas may also be used without complicating the process or impairing the product quality.

While a single reaction chamber having the desired volume and suitably heated may be used in place of tubular reactors, the use of an elongated passage with frequent reversal of direction of flow promotes better contact between the gases, prevents channeling and provides more uniform heat distribution.

By simply increasing or decreasing the rate of flow of sulfur and hydrocarbons through the reactor, maintained at a substantially constant temperature and under a constant pressure, the yield of carbon bisulfide can be varied and controlled. Likewise, an increase or decrease of pressure or temperature while maintaining a constant flow rate of sulfur and hydrocarbons will vary the yield of carbon bisulfide.

As a source of hydrocarbons, I prefer to use relatively pure methane or natural gas having a high methane content, but methane having substantial amounts of higher hydrocarbons therein may also be used. The presence of higher hydrocarbons does not lead to the complications encountered when higher hydrocarbons are present in the catalytic process of producing carbon bisulfide by the reaction of hydrocarbons and sulfur vapor.

The sulfur vapor and hydrocarbon gases are preferably fed to the apparatus in such proportions as to provide a molar ratio of sulfur to methane slightly in excess of the stoichiometrical requirements, and the excess sulfur may be recovered from the exit gases and recycled to the process.

The fact that the tubes of the reactors are maintained at a high temperature and with a relatively high flow of gas therethrough provides a self-cleaning action so that clogging and stoppage of the apparatus is practically eliminated.

The reactors are preferably constructed of stainless steel to better resist the corrosive action of the sulfur vapors although ordinary steel or lined tubes may be used.

While the reactions described herein are characterized as non-catalytic reactions to distinguish from the use of catalyst beds as described in the prior art and are believed by me to be non-catalytic, I do not exclude the possibility of catalytic reaction occuring between the walls of the reactors and the gases flowing therethrough, although various tests of the reaction previously described indicate that the extent of any reaction catalyzed by the walls of the reactor is negligible.

I make no attempt to explain the mechanics of the reaction between the sulfur and the hydrocarbon gases which I have discovered. Whether the reaction is a direct result of the combination of sulfur with the carbon and the hydrogen of the hydrocarbons or whether an intermediate reaction involving a transfer of carbon and hydrogen atoms to produce carbon bisulfide and hydrogen sulfide is not known. As shown by the tests set forth, a substantial reaction takes place between the sulfur and the hydrocarbon at superatmospheric pressure producing a high yield of carbon bisulfide.

While I have described certain tests as illustrative examples, it will be understood that my invention is not limited thereto and that the invention may be practiced in many different ways and in many different types of apparatus over that described and that various modifications and changes in operating conditions, control, etc., may be made within the spirit of my invention and the scope of the following claims.

I claim:

1. The method of producing carbon bisulfide and hydrogen sulfide by the reaction of sulfur and saturated hydrocarbons which comprises passing sulfur vapor and hydrocarbon gases under a pressure of at least 3 atm. but not exceeding the partial pressure of sulfur in the reaction mixture, through a reaction chamber constructed of commercial corrosion resistant materials and maintained at a temperature of 450° to 700° C. at a space velocity of 80 to 1000 reciprocal hours, to provide time for the said vapors to react at the said temperature and pressure in the absence of a catalyst to produce carbon bisulfide and hydrogen sulfide with a conversion of from 40% to 100% of the carbon in said hydrocarbon gas to carbon bisulfide.

2. The method of producing carbon bisulfide and hydrogen sulfide in yields of 40 to 100% based on the percentage of carbon converted to carbon bisulfide, by the reaction of sulfur and saturated hydrocarbons in the absence of a catalyst which comprises passing sulfur gases and hydrocarbon gases through a reaction chamber constructed of commercial corrosion resistant material, maintained at a temperature of 450° to 700° C. at a space velocity of 80 to 1000 reciprocal hours and at pressures in excess of 3 atm.

3. The method of claim 2 in which the reaction in the absence of a catalyst is followed by a reaction of the partially reacted sulfur and hydrocarbons and under the same conditions of pressure and temperature in the presence of a catalyst.

4. The method of producing carbon bisulfide and hydrogen sulfide by the non-catalytic reaction of sulfur and saturated hydrocarbons, which comprises contacting sulfur vapor and hydrocarbon gases at temperatures between 450° and 700° C. in a reaction chamber constructed of commercial corrosion resistant material, maintaining a pressure in excess of 3 atm. on said gases and maintaining said gases in contact with each other between 6 seconds and 1.2 min., to cause the formation of carbon bisulfide and hydrogen sulfide in the absence of a carbon bisulfide forming catalyst with a conversion of from 40% to 100% of the carbon in said hydrocarbon gas to carbon bisulfide, and separating and recovering the carbon bisulfide and hydrogen sulfide from the unreacted sulfur and hydrocarbon gases.

5. The method of reacting sulfur and saturated hydrocarbons to produce carbon bisulfide and hydrogen sulfide without the use of a catalyst which comprises passing sulfur vapor and hydrocarbon gases in the ratio of approximately 4 atoms of sulfur to 1 atom of carbon present in said hydrocarbons, through a reaction chamber constructed of commercial corrosion resistant material, maintaining said reaction chamber at a temperature of 450° to 700° C., maintaining the gases under a pressure in excess of 4.4 atm. and maintaining a space velocity of reacting gases through said reaction chamber of between 500 and 150 reciprocal hours to provide a conversion of 40% to 100% of the carbon in said hydrocarbon gas to carbon bisulfide.

6. The method of reacting sulfur and saturated hydrocarbons to produce carbon bisulfide and hydrogen sulfide without the use of a catalyst which comprises passing sulfur vapor and hydrocarbon gases through a reaction zone, said reaction zone constructed of commercial corrosion resistant material, maintaining the reaction zone at a temperature of 450 to 700° C. and maintaining the gases in said reaction zone under super-atmospheric pressure in excess of 4.4 atm. for a sufficient period of time to produce a conversion in excess of 40% of the carbon in said hydrocarbon gas, to carbon bisulfide.

7. The method of claim 6 in which the reaction products are passed through a catalytic reaction zone, under the same conditions of pressure and temperature to produce more carbon bisulfide therefrom.

8. The method of producing carbon bisulfide and hydrogen sulfide by the reaction of sulfur and saturated hydrocarbons at elevated temperatures and pressure in the absence of catalysts promoting the formation of carbon bisulfide which comprises containing sulfur vapor and hydrocarbon gas in a reaction chamber constructed of commercial corrosion resistant material, at pressures of from about 4.4 atm. to about 7 atm. and at temperatures between 450° and 700° C. for a time sufficient to produce a conversion of from 40% to 100% of the carbon in said hydrocarbon gas to carbon bisulfide and then separating the carbon bisulfide and hydrogen sulfide from the unreacted sulfur and hydrocarbons.

9. The method of producing carbon bisulfide and hydrogen sulfide by the reaction of sulfur and saturated hydrocarbons in the absence of a catalyst promoting the formation of carbon bisulfide, which comprises contacting sulfur vapor and hydrocarbon gas in a molar ratio of at least 4 atoms of sulfur to each atom of carbon in said hydrocarbons, at a pressure in excess of 4.4 atm. and temperatures between 450° and 700° C. at a space velocity of 500 to 150 reciprocal hours, which method maintains said gases in contact at the reaction pressure and temperature until at least 70% of the carbon in said hydrocarbon gas has been converted to carbon bisulfide.

10. The method of producing carbon bisulfide and hydrogen sulfide by the reaction of sulfur and saturated hydrocarbons in the absence of a catalyst promoting the formation of carbon bisulfide, which comprises passing sulfur vapor and hydrocarbon gases in the ratio of approximately 4 atoms of sulfur to 1 atom of carbon in the said hydrocarbon gases, through a reaction zone constructed of commercial corrosion resistant material, and heated to 450° to 700° C., maintaining a pressure in excess of 4.4 atm. on said heated gases in said reaction zone and maintaining a space velocity of said gases through said reaction zone of between 500 to 150 reciprocal hours to effect conversion of 70 to 100% of the carbon in said hydrocarbon gas to carbon bisulfide.

11. The method of claim 10 in which the reaction products are passed through a catalytic reaction zone, under the same conditions of pressure and temperature to produce more carbon disulfide therefrom.

References Cited in the file of this patent

UNITED STATES PATENTS

| | | |
|---|---|---|
| 1,735,409 | Pier et al. | Nov. 12, 1929 |
| 2,187,393 | De Simo | Jan. 16, 1940 |
| 2,428,727 | Thacker | Oct. 7, 1947 |
| 2,492,719 | Thacker | Dec. 27, 1949 |
| 2,666,690 | Folkins et al. | Jan. 19, 1954 |
| 2,668,752 | Folkins et al. | Feb. 9, 1954 |
| 2,709,639 | Folkins et al. | May 31, 1955 |
| 2,712,984 | Gulbert | July 12, 1955 |

FOREIGN PATENTS

| | | |
|---|---|---|
| 265,994 | Great Britain | Oct. 27, 1927 |

OTHER REFERENCES

Abstract Publication, 651,293. Pub. June 19, 1951, vol. 647, page 985, O. G. June 19, 1951.

UNITED STATES PATENT OFFICE
CERTIFICATE OF CORRECTION

Patent No. 2,882,130                                           April 14, 1959

David J. Porter

It is hereby certified that error appears in the printed specification of the above numbered patent requiring correction and that the said Letters Patent should read as corrected below.

Column 4, line 75, for "throughout" read -- throughput --; column 5, line 11, for "$C_2H_6 8.6\%$" read -- $C_2H_6 8.4\%$ --; column 6, line 70, for "between 0.2 and" read -- between 0.02 and --; column 7, line 18, for "is view" read -- in view --.

Signed and sealed this 1st day of March 1960.

(SEAL)
Attest:

KARL H. AXLINE                                                  ROBERT C. WATSON

Attesting Officer                                              Commissioner of Patents